United States Patent [19]

Kobayashi

[11] Patent Number: 5,272,675
[45] Date of Patent: Dec. 21, 1993

[54] HIGH-SPEED FIRST-IN FIRST-OUT MEMORY FLEXIBLE TO INCREASE THE MEMORY CAPACITY

[75] Inventor: Hideaki Kobayashi, Tokyo, Japan

[73] Assignee: NEC Corporation, Tokyo, Japan

[21] Appl. No.: 855,214

[22] Filed: Mar. 20, 1992

[30] Foreign Application Priority Data

Mar. 28, 1991 [JP] Japan .................................. 3-90083

[51] Int. Cl.⁵ ............................................. G11C 19/00
[52] U.S. Cl. .................................... 365/221; 365/233; 365/240; 365/189.05; 365/189.12
[58] Field of Search .................... 365/73, 75, 221, 233, 365/240, 189.05, 189.12, 168

[56] References Cited

U.S. PATENT DOCUMENTS

| | | | |
|---|---|---|---|
| 4,459,681 | 7/1984 | Ohtsuka | 365/221 |
| 4,899,307 | 2/1990 | Lenoski | 365/240 |
| 5,157,633 | 10/1992 | Aoki | 365/221 |

Primary Examiner—Eugene R. LaRoche
Assistant Examiner—Andrew Tran
Attorney, Agent, or Firm—Laff, Whitesel, Conte & Saret

[57] ABSTRACT

A first-in first-out memory stores a series of data bits in memory stages of a shift register in synchronism with a shift-in clock signal, and a pointer circuit enables an output circuit coupled in parallel with the memory stages to transfer one of the data bits to an data output terminal so that any data bit stored in the shift register is immediately read out to the data output terminal without propagation through the memory stages.

7 Claims, 5 Drawing Sheets

HIGH-SPEED FIRST-IN FIRST-OUT MEMORY FLEXIBLE TO INCREASE THE MEMORY CAPACITY

FIELD OF THE INVENTION

This invention relates to a first-in first-out memory and, more particularly, to a high-speed first-in first-out memory flexible to increase the memory capacity thereof.

DESCRIPTION OF THE RELATED ART

A first-in first-out data storage facility is used as a data buffer memory incorporated in an electronic system such as, for example, a computer system or a controller, and various arrangements have been proposed. A typical example of the first-in first-out memory is shown in FIG. 1, and largely comprises a plurality of flip flop circuits FF1, FF2, . . . and FFn coupled in series, and a controlling circuit 1 associated with the plurality of flip flop circuits FF1 to FFn. Each of the flip flop circuits FF1 to FFn is implemented by two AND gates 2 and 3 and two NOR gates 4 and 5, and serves as a stage of the first-in first-out memory for storing a single data bit. When all of the data bits stored in the plurality of flip flop circuits FF1 to FFn are sequentially read out to an data output node Qx, the controlling circuit 1 supplies an output complete signal OR to a data source (not shown), and the data source sequentially supplies new data bits to a data input node Dx in synchronism with a shift-in clock signal SI. The new data bits are propagated from stage to stage in response to timing signals TM, and are memorized in the respective stages of the first-in first-out memory. When the first new data bit reaches the final stage or the flip flop circuit FFn, the controlling circuit 1 supplies an input complete signal OR to a destination (not shown), and the new data bits are sequentially read out from the flip flop circuits FF1 to FFn to the destination in synchronism with an shift-out clock signal SO supplied from the destination. Therefore, the last data bit travels from the flip flop circuit FF1 through the flip flop circuits FF2 to FFn to the data output node Qx. The controlling circuit 1 is further responsive to an initializing signal CMR of active low level, and all of the flip flop circuits FF1 to FFn are concurrently shifted to an initializing level with internal rest signals RS.

The first-in first-out memory thus arranged is desirable for increasing or decreasing the stages, and, accordingly, is much flexible in view of the design work. However, the last data bit stored in the first stage needs to travel throughout the flip flop circuits in the read-out operation, and a large amount of time delay is introduced in the read-out operation.

Another arrangement of the first-in first-out circuit is illustrated in FIG. 2, and the first-in first-out circuit comprises a dual address port random access memory unit 11 associated with two address counters 12 and 13. The address counter 12 is coupled with the first address port AD1 of the random access memory unit 11, and sequentially increments an input address in synchronism with a shift-in clock signal SI. The shift-in clock signal is further supplied to a control node WE of the dual address port random access memory device 11, and serves as a write enable signal. The address counter 13 is coupled with the second address port AD2, and is responsive to a shift-out clock signal SO for incrementing an output address. The address counters 12 and 13 are resettable with an initializing signal MR, and the input address and the output address return to the minimum value. The dual address port random access memory device 11 is responsive to either input or output address depending upon the logic level at the control node WE, and selectively enters a write-in mode and a read-out mode of operation. The first-in first-out memory further comprises a comparator 14 and an R-S flip flop circuit 15 so as to selectively produce an input complete signal IR and an output complete signal OR. The two input nodes A and B of the comparator 14 are respectively coupled with the output nodes OUT of the first and second address counters 12 and 13, and the comparator 14 compares the input address with the output address. When the input address is matched with the output address, the comparator 14 shifts the output node EQ to logic "1" level, and either AND gates 16 or 17 produces the input complete signal IR or the output complete signal OR depending upon the output logic level of the R-S flip flop circuit 15.

In operation, when the output complete signal OR is supplied to a data source (not shown), the data source sequentially supplies data bits Dx to the data input node of the dual address port random access memory device 11, and the shift-in clock signal SI establishes the random access memory device in the write-in mode. The address counter 12 increments the input address from the minimum value to the maximum value, and the data bits Dx are sequentially written into the dual address port random access memory device 11. On the other hand, if the input complete signal IR is supplied to a destination (not shown), the dual address port random access memory device 11 is released from the write-in mode, and enters the read-out mode. The address counter 13 is responsive to the shift-out clock signal SO, and increments the output address from the minimum value to the maximum value. The dual address port random access memory device 11 supplies the first data bit to the last data bit to the destination as a series of output data bits Qx.

Even if a data bit is stored in any address, the data bit is read out from the random access memory device 11 without delay, and the first-in first-out memory is free from the drawback inherent in the first-in first-out memory implemented by a series of the flip flop circuits FF1 to FFn. However, the dual address port random access memory device sets a limit to the memory capacity of the first-in first-out memory, and complex address control is required.

SUMMARY OF THE INVENTION

It is therefore an important object of the present invention provide a first-in first-out memory which can easily increase the memory capacity without time delay.

To accomplish the object, the present invention proposes to enable an output circuit coupled between data output nodes of memory stages and a data output terminal to transfer a data bit at one of the data output nodes to said data output terminal.

In accordance with the present invention, there is provided a first-in first-out memory comprising: a) a shift register having a first memory stage, a plurality of intermediate memory stages and a final memory stage coupled in series, and operative to transfer data bits from the first memory stage through the plurality of intermediate stages to the final memory stage in synchronism with a shift-in clock signal, the first memory stage having a data input node coupled with a data input terminal where the data bits are sequentially suppled, the plurality of intermediate memory stages and the final memory stage having respective data input nodes each coupled with a data output node of the first memory stage or the previous intermediate memory stage, the final memory stage having a data output node; b) a pointer circuit having a plurality of control nodes respectively associated with the first to final stages, and operative to supply an enable signal to one of the plurality of control nodes, the enable signal being relayed through the plurality of control nodes in synchronism with the shift-in signal in a write-in mode so as to be indicative of one of the first to last memory stages storing a first data bit of the data bits, the enable signal being backwardly relayed through the plurality of control nodes in synchronism with a shift-out signal in a read-out mode; and c) an output circuit coupled between the data output nodes of the first to final memory stages and an data output terminal, and responsive to the enable signal for transferring one of the data bits to the data output terminal.

BRIEF DESCRIPTION OF THE DRAWINGS

The feature and advantages of the first-in first-out memory according to the present invention will be more clearly understood from the following description taken in conjunction with the accompanying drawings in which.

DESCRIPTION OF THE PREFERRED EMBODIMENTS

First Embodiment

Figure 1:
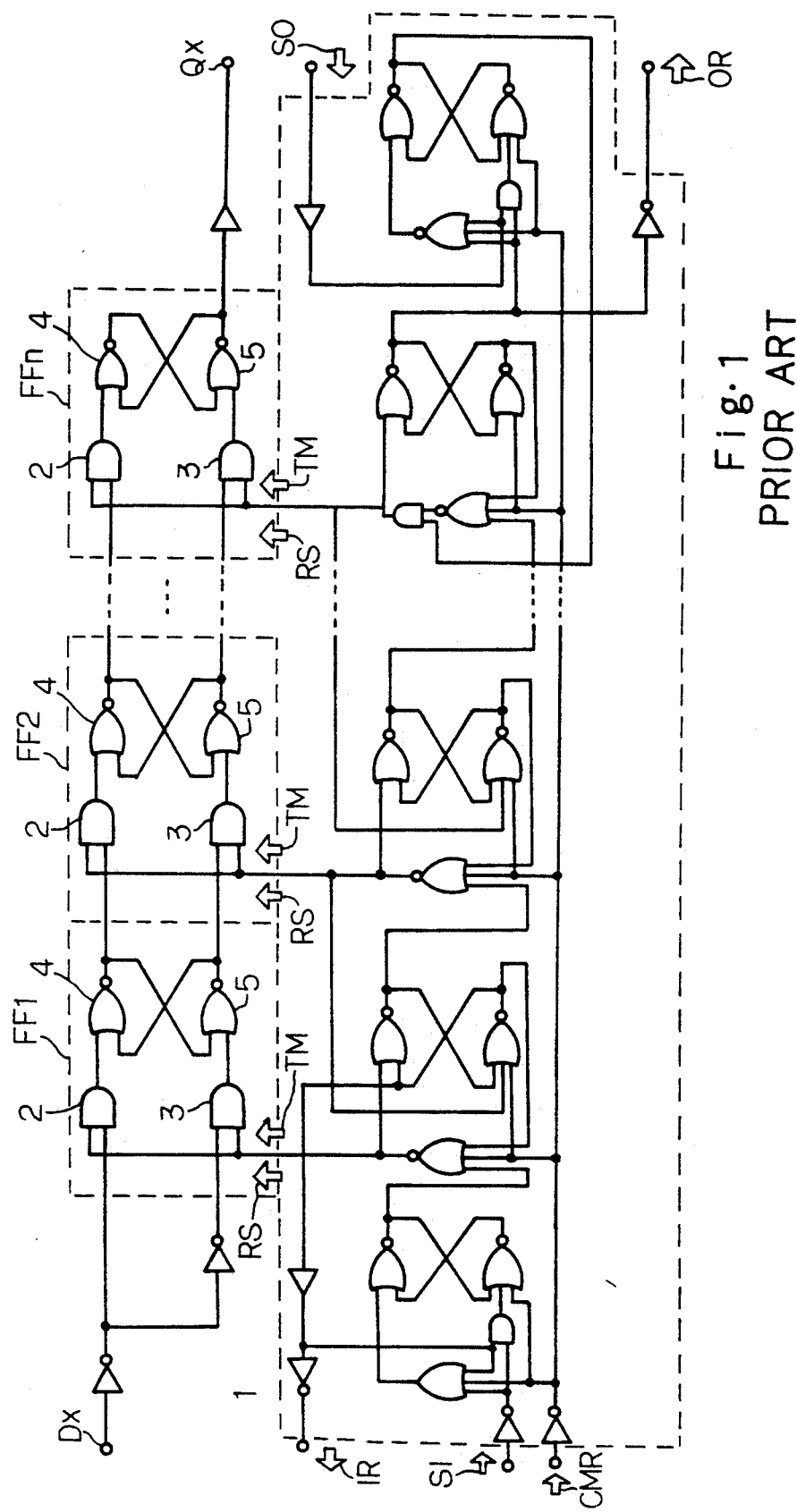
FIG. 1 is a block diagram showing the circuit arrangement of the prior art first-in first-out memory.
Figure 2:
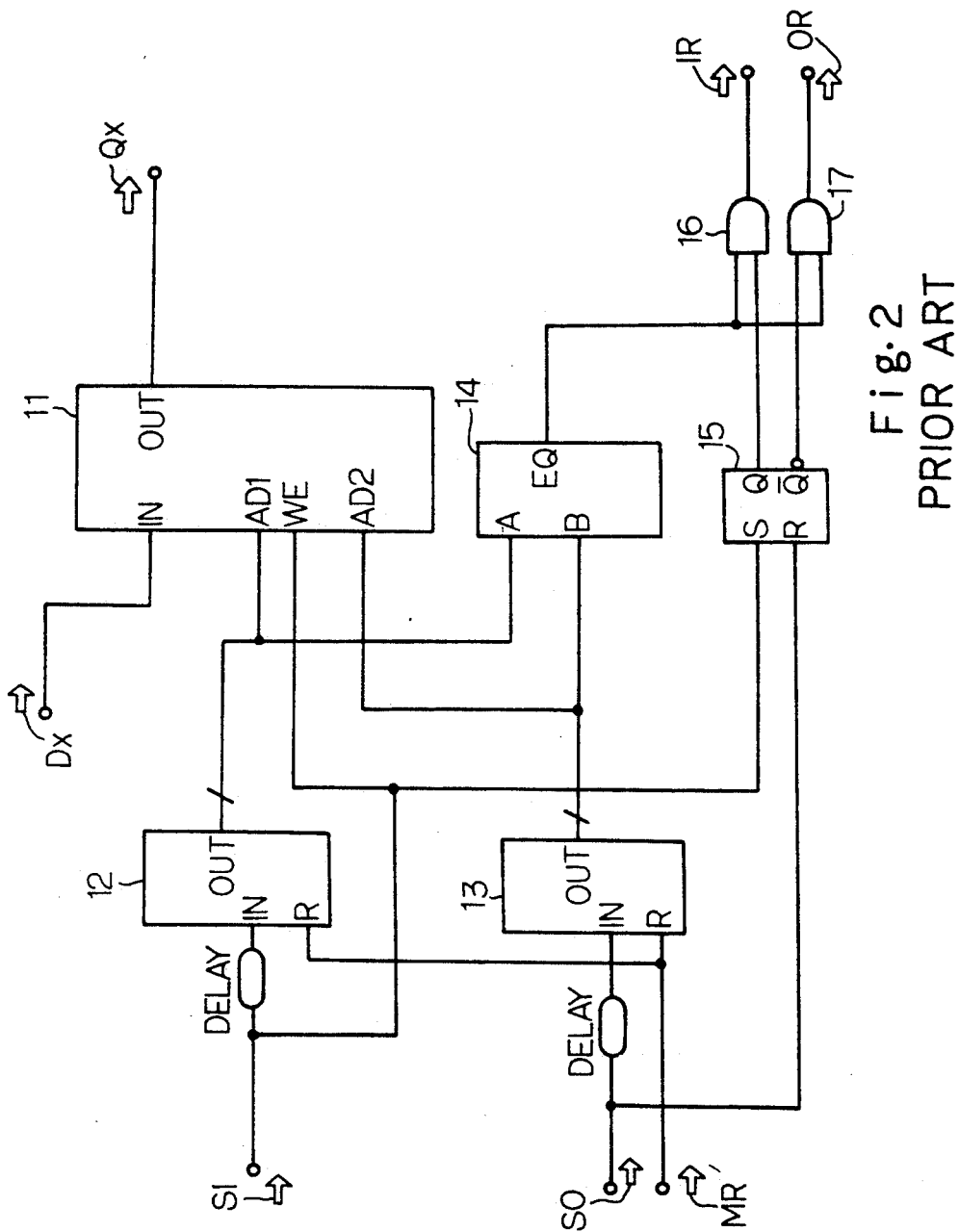
FIG. 2 is a block diagram showing the circuit arrangement of the other prior art first-in first-out memory.
Figure 3:
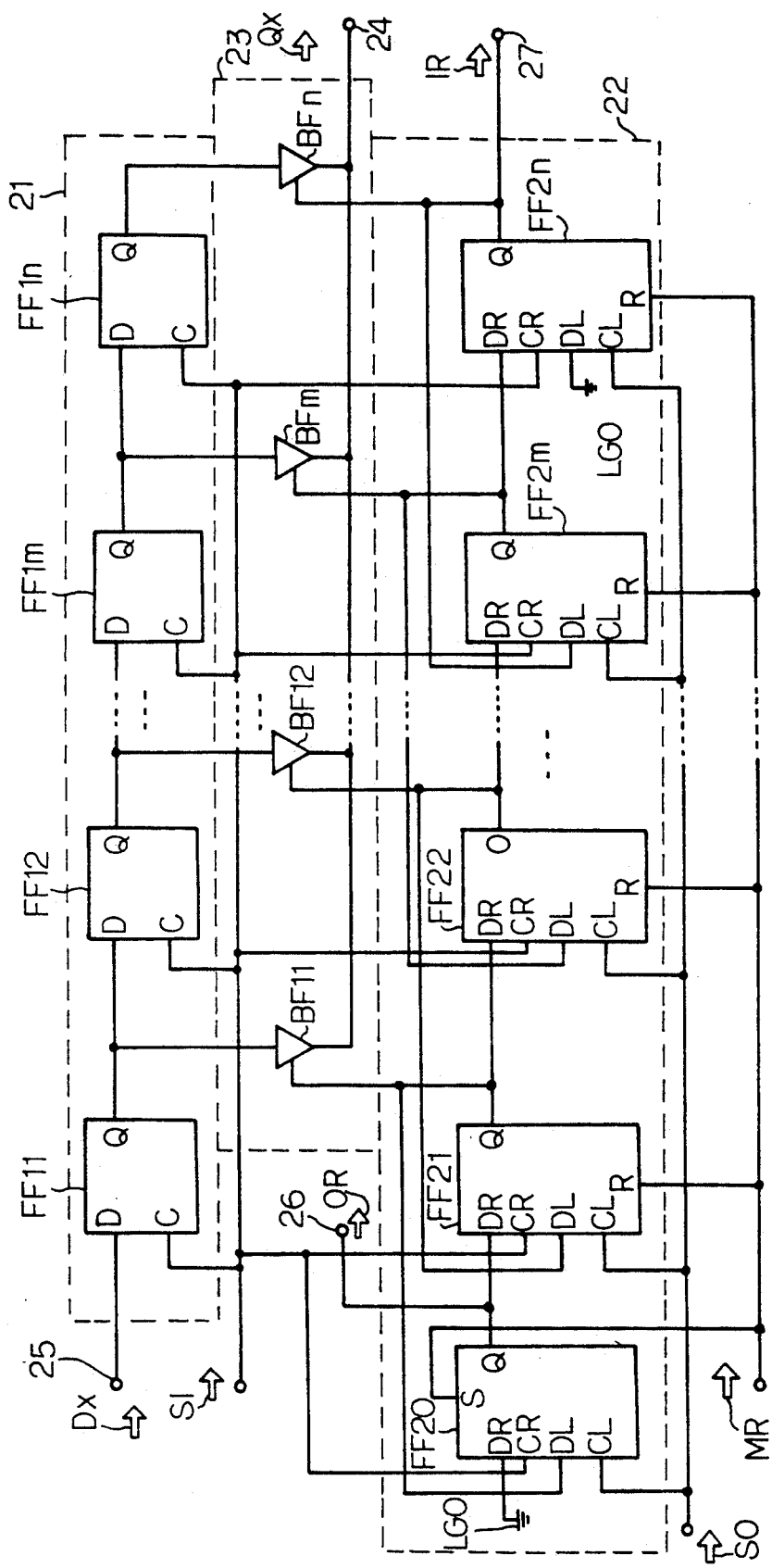
FIG. 3 is a block diagram showing the circuit arrangement of a first-in first-out memory according to the present invention.

Referring to FIG. 3 of the drawings, a first-in first-out memory embodying the present invention largely comprises a multi-stage shift register 21, a pointer circuit 22 operative to produce an enable signal for one of the stages of the shift register 21, and an output circuit 23 for selectively transferring a data bit from one of the stages to an output terminal 24. Therefore, an output data bit Qx takes place at the output terminal 24. The multi-stage shift register 21 is implemented by a series combination of flip flop circuits FF11, FF12, ..., FF1m and FF1n, and the flip flop circuit serves as the first memory stage of the first-in first-out memory. The flip flop circuits FF12 to FF1m serve as intermediate memory stages, respectively, and the flip flop circuit FF1n serves as the final memory stage. The input node D of the flip flop circuit FF11 is coupled with an input terminal 25, and the output nodes Q of the flip flop circuits FF11 to FF1m are respectively coupled with the input nodes D of the next memory stages FF12 to FF1n. A shift-in signal SI is concurrently supplied to the clock nodes C of the flip flop circuits FF1 to FF1n, and the flip flop circuits FF11 to FF1n latch an input data bit Dx and data bits at the output nodes Q of the flip flop circuits FF11 to FF1m in response to the shift-in signal SI.

The output circuit 23 is implemented by a plurality of three-state buffer circuits BF11, BF12, ..., BFm and BFn, and the three-state buffer circuits BF11 to BFn are coupled at the input nodes thereof with the output nodes Q of the flip flop circuits FF11 to FF1n, respectively. The output nodes of the three-state buffer circuits BF11 to BFn are commonly coupled with the output terminal 24. The enable signal is sequentially supplied to the three-state buffer circuits BF11 to BFn, and only one of the three-state buffer circuits BF11 to BFn is activated with the enable signal. However, the other three-state buffer circuits remain in high-impedance state.

The pointer circuit 22 is implemented by a plurality of flip flop circuits FF20, FF21, FF22, ..., FF2m and FF2n, and the flip flop circuits FF21 to FF2n are respectively associated with the three-state buffer circuits BF11 to BFn and, accordingly, with the flip flop circuits FF11 to FF1n. Each of the flip flop circuits FF20 to FF2n has a first data input node DR, a second data input node DL, a first clock input node CR for allowing the flip flop circuit to latch a data bit at the first data input node DR, a second clock input node CL for allowing the flip flop circuit to latch a data bit at the second data input node DL, a data output node Q, and either set or reset node S or R. The shift-in clock signal SI is supplied to the first clock input nodes CR of the flip flop circuits FF20 to FF2n, and a shift-out clock signal SO is distributed to the second clock input nodes CL of the flip flop circuits FF20 to FF2n. The first data input node DR of the flip flop circuit FF20 is coupled with a source of logic "0" level LG0, and the first data input nodes DR of the flip flop circuits FF21 to Ff2n are respectively coupled with the data output nodes Q of the previous flip flop circuits FF20 to FF2m. The data output node Q of the flip flop circuit FF20 is further coupled with a control node 26 so as to supply an output complete signal OR, and the data output node Q of the flip flop circuit FF2n is coupled with another control node 27 for an input complete signal IR. The second data input node DL of the flip flop circuit FF2n is coupled with the source of logic "0" level LG0, and the other second data input nodes DL are respectively coupled with the data output nodes Q of the next flip flop circuits FF21 to FF2n. An initializing signal MR is supplied to the set node S of the flip flop circuit FF20 and to the reset nodes R of the other flip flop circuits FF21 to FF2n. The pointer circuit 22 thus arranged relays the enable signal from the data output node Q of the flip flop circuit FF20 to the data output node Q of the flip flop circuit FF2n and vice versa in synchronism with the shift-in signal SI and with the shift-out signal SO. The enable signal at the control node 26 serves as the output complete signal OR, and the enable signal at the control node 27 serves as the input complete signal IR. The enable signal at one of the other data output nodes Q enables the associated three-state buffer circuit BF11 to BFn to transfer a data bit at the output node Q of the associated flip flop circuit FF11 to FF1n to the output terminal 24.

The first-in first-out memory thus arranged behaves as follows. Assuming now that the initializing signal MR goes up to logic "1" level, the flip flop circuit FF20 enters a set state, and logic "1" level takes place at the data output node Q of the flip flop circuit FF20. Then, the output complete signal OR is supplied from the control node 26 to a data source (not shown), and the data source sequentially supplies data bits Dx to the data input terminal 25 in synchronism with the shift-in clock signal SI. With the initializing signal MR, the other flip flop circuits FF21 to FF2n enter the reset state, and logic "0" level takes place at the data output nodes Q of the flip flop circuits FF21 to FF2n.

The first memory stage or the flip flop circuit FF1 is responsive to the shift-in signal SI, and latches the first data bit therein. However, the shift-in signal SI is further supplies to the first clock input nodes CR of the flip flop circuits FF20 and FF21, and the data output nodes Q of the flip flop circuits FF20 and FF21 are changed to logic "0" level and logic "1" level, respectively. For this reason, only the flip flop circuit FF21 associated with the flip flop circuit FF11 produces logic "1" level, and logic "1" level or the enable signal is indicative of the first data bit.

If the data source sequentially supplies second to last data bits to the data input terminal 25 in synchronism with the shift-in signal SI, the first to last data bits Dx are sequentially relayed from the first memory stage to the final memory stage, and the logic "1" level or the enable signal are transferred from the flip flop circuit FF21 to the flip flop circuit FF2n together with the first data bit. Therefore, the enable signal is indicative of the memory stage storing the first data bit at all times.

When the first data bit reaches the final memory stage or the flip flop circuit FF1n, the enable signal is supplied from the flip flop circuit FF2n to the three-state buffer circuit BFn, and the three-state buffer circuit BFn transfers the first data bit to the data output terminal 24. The enable signal is further supplied to a destination (not shown) as the input complete signal IR, and the destination can request the data bits Dx to the first-in first-out memory.

The destination supplies the shift-out signal SO to the first-in first-out memory, and the flip flop circuits FF21 to FF2n are responsive to the shift-out clock signal SO. Since the second data input node DL of the flip flop circuit FF2n is supplied with logic "0" level from the source LG0, the flip flop circuit FF2n changes the data output node Q to logic "0" level, and the flip flop circuit FF2m latches logic "1" level or the enable signal at the data output node Q of the flip flop circuit FF2n. Then, the enable signal is supplied from the flip flop circuit FF2m to the associated three-state buffer circuit BFm, and the three state buffer circuit BFm transfers the second data bit from the flip flop circuit FF1m to the data output terminal 24. However, the flip flop circuits Ff22 to FF20 still produce logic "0" levels at the data output nodes Q thereof.

While the destination supplies the shift-out signal SO to the pointer circuit 22, the enable signal is relayed from stage to stage toward the first flip flop circuit FF20, and the associated three-state buffer circuits sequentially transfer the third to last data bits to the data output terminal 24. After the last data bit is transferred from the flip flop circuit FF11 to the data output terminal 24, the enable signal is relayed from the flip flop circuit FF21 to the flip flop circuit FF20, and the enable signal is supplied from the control node 26 to the data source as the output complete signal OR.

As will be understood from the foregoing description, the data bits are sequentially transferred to the data output terminal 24 without any propagation together with the enable signal, and the data bits are supplied to the destination at high speed. Moreover, if flip flop circuits are added to the shift register 21 and the pointer circuit 22, the memory capacity of the first-in first-out memory is easily increased, and the first-in first-out memory is highly flexible in view of circuit design.

Second Embodiment

Figure 4:
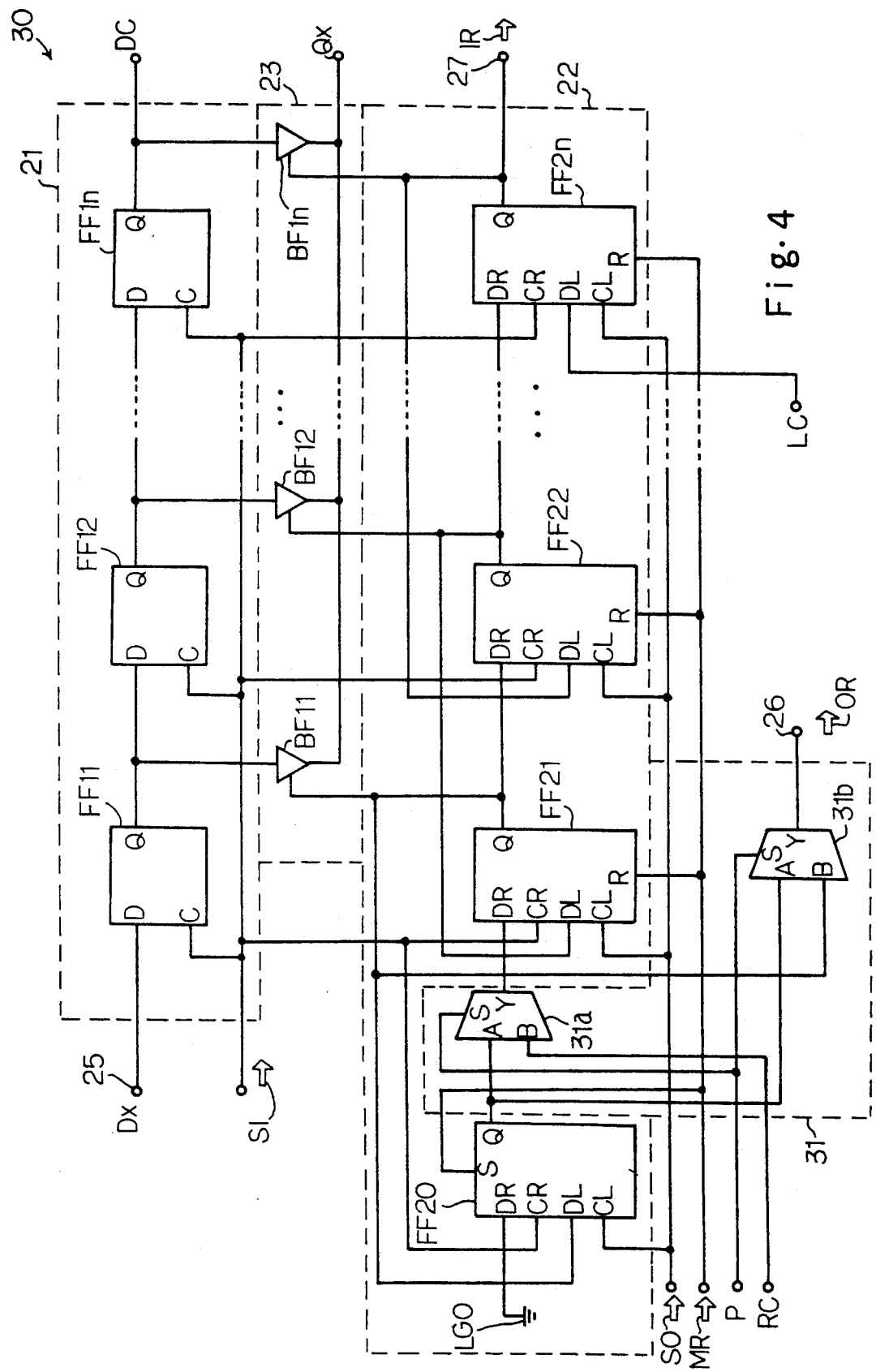
FIG. 4 is a block diagram showing the circuit arrangement of another first-in first-out memory according to the present invention.
Figure 5:
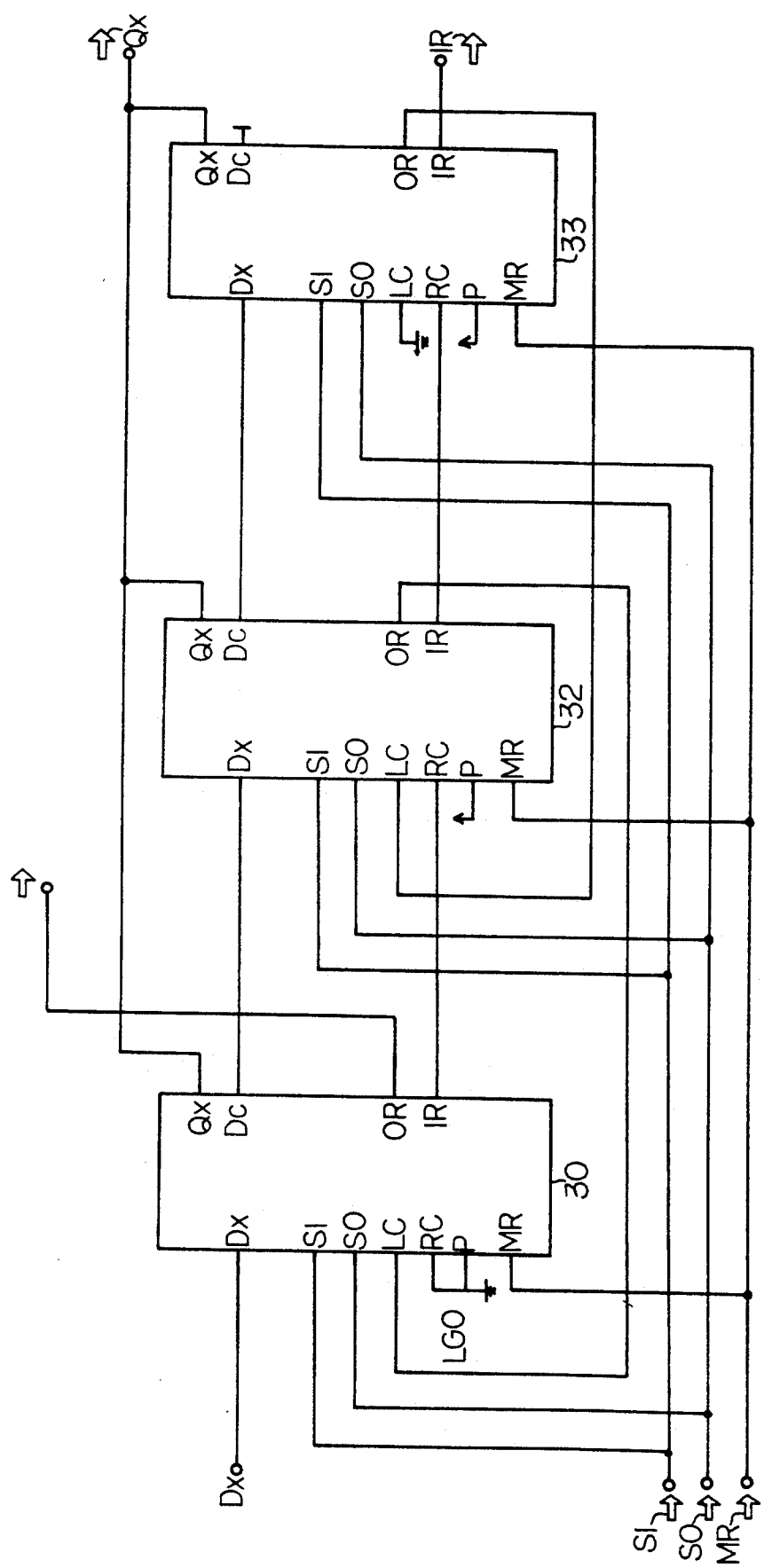
FIG. 5 is a block diagram showing the connection of a plurality of first-in first-out memories so as to increase the memory capacity.

Turning to FIG. 4 of the drawings, another first-in first-out memory embodying the present invention is illustrated, and the first-in first-out memory implementing the second embodiment is designated by reference numeral 30. The first-in first-out memory 30 is similar in arrangement to the first embodiment except for a selector circuit 31 allowing the first-in first-out memory 30 to couple with other first-in first-out memories 32 and 32 as shown in FIG. 5, and the first-in first-out memories 32 and 33 are identical in circuit arrangement with the first-in first-out memory 30. For this reason, component circuits and nodes of the first-in first-out memory 30 are labeled with the same references as those designating the corresponding circuits and node of the first-in first-out memory implementing the first embodiment.

The selector circuit 31 comprises a first selector 31a and a second selector 31b both responsive to a control signal P supplied from an external source. The first selector 31a is coupled at the two input nodes A and B with the data output node Q of the flip flop circuit FF20 and an inactivation signal RC of logic "0" level, and the output node Y of the first selector 31a is coupled with the first data input node DR of the flip flop circuit FF21. The second selector 31b is coupled at the two input nodes A and B with the data output nodes Q of the flip flop circuits FF20 and FF21, respectively, and the output node Y of the second selector 31b is coupled with the control node 26.

If a data storage is formed from the first-in first-out memory 30 alone, the data output node of the flip flop circuit FF1n may be disconnected from a data transfer node Dc, and the control node 27 directly supplies the input complete signal IR to a destination (not shown). However, if the first-in first-out memory 30 forms a data storage together with the first-in first-out memories 32 and 33 as shown in FIG. 5, the data output node of the flip flop circuit FF1n is connected through the data transfer node Dc with the data input node Dx of the next first-in first-out memory 32, and the input complete signal IR is supplied to the first-in first-out memory 32 instead of the destination. Moreover, the second data input node DL of the flip flop circuit FF2n is coupled through a transfer node LC with the control node 26 of the first-in first-out memory 32 instead of the source of logic "0" level LG0. However, if the first-in first-out memory 30 is used alone, the transfer node LC is coupled with the source of logic "0" level LG0 as similar to the first embodiment.

The first-in first-out memory 30 thus arranged behaves as follows. If the control signal P causes the first and second selectors 31a and 31b to interconnect the input nodes A and the output nodes y, respectively, the behavior of the first-in first-out memory 30 is similar to the first embodiment. If the first-in first-out memory 30 forms a data storage together with at least the first-in first-out memory 32, the control signal P causes the first and second selectors 31a and 31b to interconnect the input nodes B and the output nodes Y, respectively, while data bits are written into or read out from the first-in first-out memory 32. Since the inactivation signal RC forcibly sets down the enable signal at the data output node Q of the flip flop circuit FF21 to the inactive logic "0" level, any data bit is read out from the shift register 21, and the second selector 31b keeps the output complete signal in the inactive logic "0" level.

Thus, the selector circuit 31 allows the first-in first-out memory 30 to couple with the other first-in first-out memories 32 and 33, and the memory capacity is enlarged through the simple connections.

Although particular embodiments of the present invention have been shown and described, it will be obvious to those skilled in the art that various changes and modifications may be made without departing from the spirit and scope of the present invention. For example, various kinds of flip flop circuit are available for fabricating the first-in first-out memory.

What is claimed is:

1. A first-in first-out memory comprising:
   a) a shift register having a first memory stage, a plurality of intermediate memory stages and a final memory stage coupled in series, and operative to transfer data bits from said first memory stage through said plurality of intermediate memory stages to said final memory stage in synchronism with a shift-in clock signal, said first memory stage having a data input node coupled with a data input terminal where said data bits are sequentially supplied, said plurality of intermediate memory stages and said final memory stage having respective data input nodes each coupled with a data output node of said first memory stage or the previous intermediate memory stage, said final memory stage having a data output node;
   b) a pointer circuit having a plurality of control nodes respectively associated with said first to final memory stages, and operative to supply an enable signal to one of said plurality of control nodes, said enable signal being relayed through said plurality of control nodes in synchronism with said shift-in clock signal in a write-in mode so as to be indicative of one of said first to last memory stages storing a first data bit of said data bits, said enable signal being backwardly relayed through said plurality of control nodes in synchronism with a shift-out signal in a read-out mode; and
   c) an output circuit coupled between said data output nodes of said first to final memory stages and an data output terminal, and responsive to said enable signal for transferring one of said data bits to said data output terminal.

2. A first-in first-out memory as set forth in claim 1, in which said shift register is implemented by a plurality of first flip flop circuits coupled in series, each of said plurality of first flip flop circuits having one of said data input nodes, one of said data output nodes and a clock node supplied with said shift-in clock signal for latching one of said data bits.

3. A first-in first-out memory as set forth in claim 2, in which said pointer circuit is implemented by a plurality of second flip flop circuits larger in number than said first flip flop circuits by one and coupled in series, said plurality of second flip flop circuits serving as a first pointer stage, a plurality of intermediate pointer stages and a final pointer stage each having first and second data input nodes respectively associated with first and second clock input nodes, at least one of set and reset nodes, and a data output node, the first data input node of said first pointer stage and the second data input node of said final pointer stage being coupled with a source of inactive level, each of the first data input nodes of said plurality of intermediate pointer stages and said final pointer stage being respectively coupled with the data output node of said first pointer stage or the data output node of the previous intermediate pointer stage, each of the second data input nodes of said first pointer stage and said plurality of intermediate pointer stages being coupled with the data output node of the next intermediate pointer stage or the data output node of said final pointer stage, said shift-in clock signal being supplied to the first clock nodes of said first, intermediate and final pointer stages, a shift-out clock signal being supplied to the second clock nodes of said first, intermediate and final pointer stages, an initializing signal being supplied to the set node of said first pointer stage and to the reset nodes of said intermediate and final pointer stages, said enable signal being selectively supplied from the data output nodes of said intermediate and final pointer stages, an output complete signal and an input complete signal being produced at the data output nodes of said first and final pointer stages, respectively.

4. A first-in first-out memory as set forth in claim 2, in which said output circuit is implemented by a plurality of three-state buffer circuits equal in number to said first flip flop circuits, input nodes of said plurality of three-state buffer circuits being coupled with the data output nodes of said plurality of first flip flop circuits, respectively, output nodes of said plurality of three-state buffer circuits being commonly coupled with said data output terminal, control nodes of said plurality of three-state buffer circuits being coupled with the data output nodes of said the intermediate and final pointer stages.

5. A first-in first-out memory as set forth in claim 2, in which said first-in first-out memory further comprises
   d) a selector circuit associated with said pointer circuit, and responsive to a control signal to shift said pointer circuit between an active state and an inactive state, said pointer circuit being operative to selectively produce said enable signal in said active state and to cause said enable signal to disappear in said inactive state.

6. A first-in first-out memory as set forth in claim 5, in which said pointer circuit is implemented by a plurality of second flip flop circuits larger in number than said first flip flop circuits by one and coupled in series, said plurality of second flip flop circuits serving as a first pointer stage, a plurality of intermediate pointer stages and a final pointer stage each having first and second data input nodes respectively associated with first and second clock input nodes, at least one of set and reset nodes, and a data output node, the first data input node of said first pointer stage being coupled with a source of inactive level, the second data input node of said final pointer stage being coupled with a transfer node connectable with a control node of another first-in first-out memory for receiving an output complete signal, each of the first data input nodes of said plurality of intermediate pointer stages and said final pointer stage being respectively connectable with the data output node of said first pointer stage or the data output node of the previous intermediate pointer stage, each of the second data input nodes of said first pointer stage and said plurality of intermediate pointer stages being connectable with the data output node of the next intermediate pointer stage or the data output node of said final pointer stage, said shift-in clock signal being supplied to the first clock nodes of said first, intermediate and final pointer stages, a shift-out clock signal being supplied to the second clock nodes of said first, intermediate and final pointer stages, an initializing signal being supplied to the set node of said first pointer stage and to the reset nodes of said intermediate and final pointer stages, said enable signal being selectively supplied from the data output nodes of said intermediate and final pointer stages, said output complete signal and an input complete signal being produced at the data output nodes of said first and final pointer stages, respectively.

7. A first-in first-out memory as set forth in claim 6, in which said selector circuit comprises: a first selector responsive to said control signal, and having a first input node coupled with the data output node of said first pointer stage, a second input node supplied with an inactivation signal and an output node coupled with the first data input node of the next pointer stage; and a second selector responsive to said control signal, and having first and second input nodes respectively coupled with the data output node of said first pointer stage and with the data output node of said intermediate pointer stage next to said first pointer stage, and an data output node coupled with the control node where said output complete signal takes place.

* * * * *